Aug. 11, 1964  D. C. REILLY  3,144,235
WING ROLLER SUPPORTING BRACKET
Filed Oct. 28, 1963  2 Sheets-Sheet 2

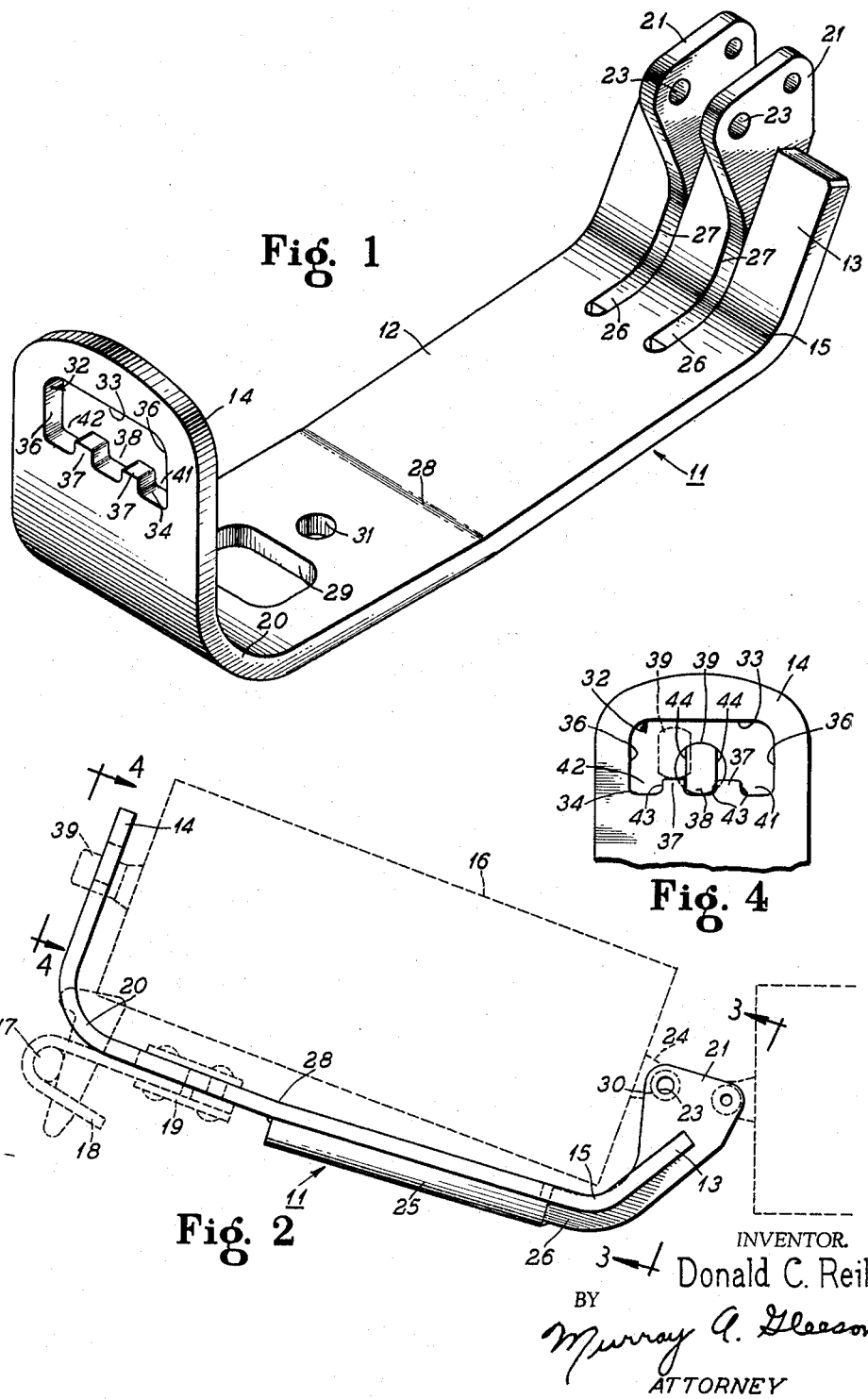

INVENTOR.
Donald C. Reilly
BY Murray A. Gleeson
ATTORNEY

United States Patent Office 3,144,235
Patented Aug. 11, 1964

3,144,235
WING ROLLER SUPPORTING BRACKET
Donald C. Reilly, Downers Grove, Ill., assignor to Goodman Manufacturing Company, Chicago, Ill., a corporation of Illinois
Filed Oct. 28, 1963, Ser. No. 319,484
6 Claims. (Cl. 248—251)

This invention relates generally to belt conveyors and particularly to an improved flexible troughing idler assembly for a rope sideframe conveyor.

Specifically, this invention is an improved wing roller supporting bracket for a troughing idler assembly of the kind shown in assignee's co-pending patent application Serial No. 127,048, filed July 26, 1961.

The present bracket has the following advantages: stronger under impact; more precise control of belt training; reduced number of pieces in the assembly; and cheaper manufacturing costs.

Under very heavy impact loads, these wing roller brackets are weakest, and tend to permanently deform and straighten out, at their inner end portion, in the bight where the upturned wall at the end of the base plate supports a pair of ears for the inner end of the wing roller. It is a primary feature of the present invention that the ears take the form of plates extending across the bight with their lower margins welded or otherwise made integral with the upturned end wall and with the immediately adjacent portion of the base plate. And a preferred form will have the ear plates extending through the end wall and base plate to provide longitudinal rib means along the bottom. Thus, the strength-to-weight ratio is greatly increased in this critical area by a novel re-arrangement of individual parts which have to be used anyway.

Other objects and advantages will be apparent from the following description taken in connection with the accompanying drawing in which:

FIGURE 1 is a perspective view of a wing roller supporting bracket showing a preferred form of the present invention;

FIG. 2 is a side view of FIG. 1;

FIG. 4 is a partial outer end view of FIGS. 1 and 2 taken along the line 4, 4 of FIG. 2.

Like parts are designated by like reference characters throughout the figures of the drawing.

Figure 3:
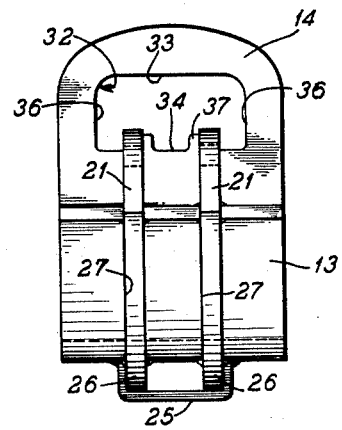
FIG. 3 is an inner end view of FIGS. 1 and 2 taken along the line 3, 3 of FIG. 2.

Inasmuch as the present invention relates to specific improvements in the supporting bracket for the wing roller, this description will be confined to the improved bracket and minimal reference will be made to the troughing idler assembly as a whole and the conveyor generally which have been covered in detail in the above-mentioned co-pending Serial No. 127,048.

The bracket, generally designated 11, comprises an elongated base plate 12 having inner and outer upwardly inclined end walls 13 and 14, respectively beyond bights or bends 15 and 20. The terms "inner" and "outer" are used here in the sense that they are consistent with the corresponding ends of a wing roller which, for the sake of environment and application, is indicated in broken lines in FIG. 2 with the reference number 16. The base plate may be held onto a wire rope sideframe 17 by a rope clamp 18 connected by a link 19, all of which is described in detail in the above-mentioned co-pending application.

Figure 5:
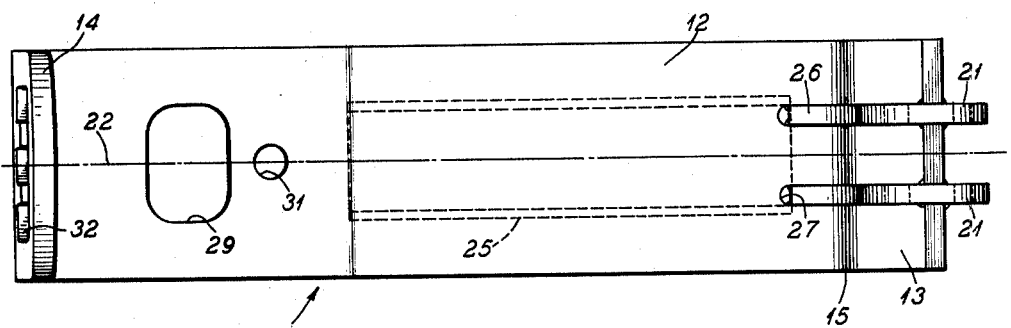
FIG. 5 is a plan view.

The inner end wall 13 is strengthened against distortion due to impact loads in a special way which enables maximum impact load resistance with minimum amount of metal. Extending upward from the top side of wall 13 is a pair of upstanding plates 21, 21. As shown in FIG. 5, these are spaced apart on opposite sides of, and parallel to, a longitudinal centerline indicated by the number 22. Supporting means, in the present case pin holes 23, 23, are provided in the plates 21 for the inner end of a wing roller shaft 24. The inner wall 13 is strengthened by rib means (FIG. 2) depending from the underside of that inner end wall and extending parallel to the centerline 22 into the adjacent underside portion of the base plate 12. In the present case this construction is a pair of ribs 26, 26 which are the bottom edges of the plates 21, 21. A portion of the rib means is a short piece of channel 25 welded to the bottom side of the base plate. This, where desired, can serve the additional function of protecting grease tubes (not shown) which extend from the inner end of the roller to the outside for ease access in greasing. The particular bracket shown is manufactured by cutting a pair of parallel slots 27, 27 from the end wall 13 into the adjacent portion of the base plate 12 and then welding the upstanding plates 21, 21 in place.

By this construction it will be seen that the inner end of the roller shaft 24 is supported on a pin 30 in the holes 23 which are directly above the rib-strengthened portion of the bracket to greatly increase the strength of the inner portion of the bracket without creating sufficient bulk to scrape against the return run of the belt during extreme downward deflection under maximum loading. To further eliminate conflict between the inner end wall 13, rib means 26, 26 and such a return run of a belt, the inner end portion of the base plate 12 is bent upward at 28 at an angle of 1½ to 10 degrees depending on the particular troughing idler assembly it is used with. This puts the inner surface of the end wall 13 close to the inner corner of the wing roller without interference; yet leaves enough room between the base plate outer portion and the wing roller for the connecting link 19. Referring to FIG. 1, the base plate is cut away as at 29 for the connecting link 19 and a drilled opening 31 is provided for a pivot pin for the link 19.

The outer end wall 14 has an aperture 32 circularly disposed with respect to the centerline 22. It is defined by upper, lower and side edges 33, 34 and 36, 36. The lower edge 34 comprises a horizontally extending ledge provided with upstanding separating detents 37, 37 which define a center pocket 38 to support the outer end 39 of a wing roller shaft in a neutral-training position; and additional pockets 41, 42 flanking the center pocket to support the wing roller shaft outer end 39 in forward- and rearward-canted positions.

As shown in FIG. 4, the aperture 32 has sufficient height between the upper edge 33 and the tops of the detent 37 to enable the outer end of the wing roller shaft to be shifted from one pocket to any other without removing it from the aperture.

The side edges 43, 43 of the detents 37 are preferably vertical and parallel to one another, thereby capable of cooperating with similar vertical, parallel flats 44, 44 at the end of the wing roller shaft to enable precise positioning to the latter in neutral or canted positions.

While one form in which the present invention has been shown and described, it will be understood that various modifications may be made within the spirit and scope of the invention which should be limited only by the appended claims.

I claim:

1. A supporting bracket adapted to support the inner and outer opposite ends of a wing roller in a flexible troughing idler assembly comprising:

an elongated base plate adapted to underlie a wing roller and having inner and outer upwardly inclined end walls extending therefrom and corresponding to the inner and outer ends of such wing roller;

the inner end wall being upwardly inclined from the base plate and having on the top side thereof a pair of upstanding plates spaced apart on opposite sides of and parallel to a longitudinal centerline of said base plate;

said pair of upstanding plates having supporting means for the inner end of a wing roller shaft;

rib means depending from the underside of said inner end wall and extending parallel to said centerline into the adjacent underside portion of said base plate;

said outer end wall having an aperture centrally disposed with respect to said centerline and having a lower horizontally extending ledge provided with a center pocket adapted to support the outer end of a wing roller shaft in a neutral-training position, said ledge being further provided with additional pockets flanking the center pocket to support said outer end of the wing roller shaft in forward- and rearward-canted positions;

said pockets being upwardly open into said aperture to enable said outer end of said wing roller shaft to be shifted from one pocket to any other without removing it from the aperture.

2. A supporting bracket according to claim 1 in which said pockets are separated by upstanding detents having vertical roller-shaft-engaging side edges.

3. A supporting bracket adapted to support the inner and outer opposite ends of a wing roller in a flexible troughing idler assembly comprising:

an elongated base plate adapted to underlie a wing roller and having inner and outer upwardly inclined end walls extending therefrom and corresponding to the inner and outer ends of such wing roller;

the inner end wall being upwardly inclined from the base plate and having on the top side thereof a pair of upstanding plates spaced apart on opposite sides of and parallel to a longitudinal centerline of said base plate;

said pair of upstanding plates having supporting means for the inner end of a wing roller shaft;

rib means depending from the underside of said inner end wall and extending parallel to said centerline into the adjacent underside portion of said base plate;

said rib means comprising the lower edge portions of said upstanding plates extending through slots in said inner end wall and base plate; and said outer end wall having means for supporting the outer end of a wing roller shaft.

4. A supporting bracket adapted to support the inner and outer opposite ends of a wing roller in a flexible troughing idler assembly comprising:

an elongated base plate adapted to underlie a wing roller and having inner and outer upwardly inclined end walls extending therefrom and corresponding to the inner and outer ends of such wing roller;

the inner end wall being upwardly inclined from the base plate and having on the top side thereof a pair of upstanding plates spaced apart on opposite sides of and parallel to a longitudinal centerline of said base plate;

said pair of upstanding plates having supporting means for the inner end of a wing roller shaft;

rib means depending from the underside of said inner end wall and extending parallel to said centerline into the adjacent underside portion of said base plate; and said outer end wall having means for supporting the outer end of a wing roller shaft.

5. A supporting bracket in accordance with claim 4 in which said base plate is bent, concave upward, intermediate its ends, at an angle of 5 to 10 degrees.

6. A supporting bracket adapted to support the inner and outer opposite ends of a wing roller in a flexible troughing idler assembly comprising:

an elongated base plate adapted to underlie a wing roller and having inner and outer upwardly inclined end walls extending therefrom and corresponding to the inner and outer ends of such wing roller;

the inner end wall being upwardly inclined from the base plate and having on the top side thereof a pair of upstanding plates spaced apart on opposite sides of and parallel to a longitudinal centerline of said base plate;

said pair of upstanding plates having supporting means for the inner end of a wing roller shaft;

rib means depending from the underside of said inner end wall and extending parallel to said centerline into the adjacent underside portion of said base plate;

reinforcing rib means for said inner end wall and for the inner end portion of the base plate including means forming said upstanding plates with their bottom edges integral with the topside of said inner end wall and inner end portion of the base plate; and said outer end wall having means for supporting the outer end of a wing roller shaft.

References Cited in the file of this patent
UNITED STATES PATENTS

| | | |
|---|---|---|
| 3,083,815 | Lo Presti | Apr. 2, 1963 |
| 3,101,192 | Stinson | Aug. 20, 1963 |
| 3,109,534 | Lo Presti | Nov. 5, 1963 |